United States Patent
Chen et al.

(10) Patent No.: US 10,999,220 B2
(45) Date of Patent: May 4, 2021

(54) CONTEXT AWARE MIDDLEBOX SERVICES AT DATACENTER EDGE

(71) Applicant: VMware, Inc., Palo Alto, CA (US)

(72) Inventors: Tori Chen, San Jose, CA (US); Sirisha Myneni, Santa Clara, CA (US); Arijit Chanda, San Jose, CA (US); Arnold Poon, San Mateo, CA (US); Farzad Ghannadian, Palo Alto, CA (US); Venkat Rajagopalan, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 331 days.

(21) Appl. No.: 16/028,342

(22) Filed: Jul. 5, 2018

(65) Prior Publication Data

US 2020/0014638 A1 Jan. 9, 2020

(51) Int. Cl.
*H04L 29/06* (2006.01)
*G06F 9/445* (2018.01)
(Continued)

(52) U.S. Cl.
CPC .......... *H04L 49/70* (2013.01); *G06F 9/45558* (2013.01); *H04L 12/4641* (2013.01);
(Continued)

(58) Field of Classification Search
CPC . H04L 49/70; H04L 12/4641; H04L 12/0803; H04L 45/38; H04L 45/74; H04L 47/125; H04L 9/45558; H04G 9/45558
(Continued)

(56) References Cited

U.S. PATENT DOCUMENTS

| 5,504,921 A | 4/1996 | Dev et al. |
| 5,528,516 A | 6/1996 | Yemini et al. |

(Continued)

FOREIGN PATENT DOCUMENTS

| WO | 2013184846 A1 | 12/2013 |
| WO | 2020009784 A1 | 1/2020 |

OTHER PUBLICATIONS

Non-Published commonly owned International Patent Application PCT/US2019/036645, filed Jun. 12, 2019, 46 pages, VMware, Inc.
(Continued)

*Primary Examiner* — Paul H Masur
*Assistant Examiner* — Ellen A Kirillova
(74) *Attorney, Agent, or Firm* — Adeli LLP

(57) ABSTRACT

Some embodiments of the invention provide a novel architecture for capturing contextual attributes on host computers that execute one or more machines and providing the captured contextual attributes to middlebox service engines executing at the edge of a physical datacenter. In some embodiments, the middlebox service engines run in an edge host (e.g., an NSX Edge) that provides routing services and connectivity to external networks (e.g., networks external to an NSX-T deployment). Some embodiments execute a context header insertion processor that receives contextual attributes relating to network events and/or process events on the machines collected using a guest-introspection (GI) agent on each machine. In some embodiments, the context header insertion processor uses these contextual attributes to generate a header including data regarding the contextual attributes (a "context header") that is used to encapsulate a data message that is processed by the SFE.

18 Claims, 13 Drawing Sheets

(51) Int. Cl.

| | | |
|---|---|---|
| *H04L 12/931* | (2013.01) | |
| *H04L 12/741* | (2013.01) | |
| *H04L 12/24* | (2006.01) | |
| *H04L 12/721* | (2013.01) | |
| *G06F 9/455* | (2018.01) | |
| *H04L 12/803* | (2013.01) | |
| *H04L 12/46* | (2006.01) | |

(52) U.S. Cl.
CPC .......... *H04L 41/0803* (2013.01); *H04L 45/38* (2013.01); *H04L 45/74* (2013.01); *H04L 47/125* (2013.01); *G06F 2009/45595* (2013.01); *H04L 2212/00* (2013.01)

(58) Field of Classification Search
USPC ........................................................ 370/229
See application file for complete search history.

(56) References Cited

U.S. PATENT DOCUMENTS

| | | |
|---|---|---|
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 5,825,779 A | 10/1998 | Putnins et al. |
| 6,104,699 A | 8/2000 | Holender et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,842,768 B1 | 1/2005 | Shaffer et al. |
| 6,941,487 B1 | 9/2005 | Balakrishnan et al. |
| 6,963,585 B1 | 11/2005 | Pennec et al. |
| 7,079,544 B2 | 7/2006 | Wakayama et al. |
| 7,096,228 B2 | 8/2006 | Theimer et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,483,370 B1 | 1/2009 | Dayal et al. |
| 7,606,260 B2 | 10/2009 | Oguchi et al. |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,937,438 B1 | 5/2011 | Miller et al. |
| 7,948,986 B1 | 5/2011 | Ghosh et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 8,705,513 B2 | 4/2014 | Merwe et al. |
| 9,021,098 B1 | 4/2015 | Nagle et al. |
| 9,596,126 B2 | 3/2017 | Shen et al. |
| 10,148,484 B2 | 12/2018 | Shen et al. |
| 10,225,270 B2 | 3/2019 | Reddy et al. |
| 10,374,830 B1 | 8/2019 | Datta et al. |
| 2003/0006919 A1 | 1/2003 | Collins et al. |
| 2003/0093481 A1 | 5/2003 | Mitchell et al. |
| 2004/0047286 A1 | 3/2004 | Larsen et al. |
| 2004/0073659 A1 | 4/2004 | Rajsic et al. |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2006/0002370 A1 | 1/2006 | Rabie et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2007/0043860 A1 | 2/2007 | Pabari |
| 2007/0156919 A1 | 7/2007 | Potti et al. |
| 2007/0220059 A1 | 9/2007 | Lu et al. |
| 2007/0220358 A1 | 9/2007 | Goodill et al. |
| 2007/0260721 A1 | 11/2007 | Bose et al. |
| 2007/0283348 A1 | 12/2007 | White |
| 2007/0297428 A1 | 12/2007 | Bose et al. |
| 2008/0002579 A1 | 1/2008 | Lindholm et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0080559 A1 | 4/2008 | Singh |
| 2008/0159301 A1 | 7/2008 | Heer |
| 2008/0165704 A1 | 7/2008 | Marchetti et al. |
| 2009/0067331 A1 | 3/2009 | Watsen et al. |
| 2009/0296726 A1 | 12/2009 | Snively et al. |
| 2010/0039296 A1 | 2/2010 | Marggraff et al. |
| 2010/0125667 A1 | 5/2010 | Soundararajan |
| 2010/0169441 A1 | 7/2010 | Lafleur et al. |
| 2010/0177789 A1 | 7/2010 | Chen et al. |
| 2011/0103259 A1 | 5/2011 | Aybay et al. |
| 2011/0296052 A1 | 12/2011 | Guo et al. |
| 2012/0075991 A1 | 3/2012 | Sugita et al. |
| 2012/0120964 A1 | 5/2012 | Koponen et al. |
| 2012/0147894 A1 | 6/2012 | Mulligan et al. |
| 2012/0226799 A1 | 9/2012 | Kapur et al. |
| 2013/0024579 A1 | 1/2013 | Zhang et al. |
| 2013/0044752 A1 | 2/2013 | Koponen et al. |
| 2013/0103817 A1 | 4/2013 | Koponen et al. |
| 2013/0332602 A1 | 12/2013 | Nakil et al. |
| 2013/0332619 A1 | 12/2013 | Xie et al. |
| 2014/0050223 A1 | 2/2014 | Foo et al. |
| 2014/0089488 A1 | 3/2014 | Chong et al. |
| 2014/0181829 A1 | 6/2014 | Hathaway et al. |
| 2014/0229944 A1 | 8/2014 | Wang et al. |
| 2014/0241247 A1 | 8/2014 | Kempf et al. |
| 2014/0280836 A1 | 9/2014 | Kumar et al. |
| 2014/0351229 A1 | 11/2014 | Gupta |
| 2014/0355516 A1 | 12/2014 | Baudoin et al. |
| 2015/0009995 A1 | 1/2015 | Gross, IV et al. |
| 2015/0103645 A1 | 4/2015 | Shen et al. |
| 2015/0103661 A1 | 4/2015 | Shen et al. |
| 2016/0080244 A1 | 3/2016 | Retana et al. |
| 2016/0099853 A1 | 4/2016 | Nedeltchev et al. |
| 2016/0105377 A1 | 4/2016 | Nakagawa |
| 2016/0119156 A1 | 4/2016 | Drake et al. |
| 2016/0330070 A1 | 11/2016 | Datta et al. |
| 2016/0330111 A1 | 11/2016 | Manghirmalani et al. |
| 2016/0380886 A1 | 12/2016 | Blair et al. |
| 2017/0063674 A1 | 3/2017 | Maskalik et al. |
| 2017/0063782 A1 | 3/2017 | Jain et al. |
| 2017/0078207 A1 | 3/2017 | Atkins et al. |
| 2017/0235774 A1 | 8/2017 | Colgrove et al. |
| 2017/0317954 A1 | 11/2017 | Masurekar et al. |
| 2017/0359247 A1 | 12/2017 | Dixon |
| 2018/0006935 A1 | 1/2018 | Mutnuru et al. |
| 2018/0063036 A1* | 3/2018 | Chandrashekhar ..... H04L 49/15 |
| 2018/0159957 A1* | 6/2018 | Hooda .................... H04L 45/64 |
| 2018/0270288 A1 | 9/2018 | Wang et al. |
| 2018/0295036 A1 | 10/2018 | Krishnamurthy et al. |
| 2019/0028300 A1 | 1/2019 | Mathew et al. |
| 2019/0045031 A1 | 2/2019 | Feghali et al. |
| 2019/0075012 A1 | 3/2019 | Shen et al. |

(56) References Cited

U.S. PATENT DOCUMENTS

| | | |
|---|---|---|
| 2019/0104111 A1 | 4/2019 | Cidon et al. |
| 2019/0149512 A1* | 5/2019 | Sevinc ................ H04L 63/0218 726/11 |
| 2019/0238363 A1* | 8/2019 | Boutros .................. H04L 45/34 |
| 2020/0014663 A1 | 1/2020 | Chen et al. |
| 2020/0162377 A1 | 5/2020 | Sarva et al. |
| 2020/0177458 A1 | 6/2020 | Rahman et al. |

OTHER PUBLICATIONS

PCT International Search Report and Written Opinion dated Sep. 2, 2019 for commonly owned International Patent Application PCT/US2019/036645, 13 pages, VMware, Inc.

Author Unknown, "Viltual Machine Backup Guide," Nov. 2007, 78 pages, VMware, Inc., Palo Alto, California.

Author Unknown, "Apache Catisandra™ 1.2 Documentation," Jan. 13, 2013, 201 pages, DataStax.

Non-Published commonly owned U.S. Appl. No. 16/028,347, filed Jul. 5, 2018, 46 pages, VMware, Inc.

\* cited by examiner

| Source | Source Port | Destination | Destination Port | Protocol | Context |
|---|---|---|---|---|---|
| 1.1.1.1 | 33445 | 2.2.2.2 | 80 | TCP | Firefox.exe |
| 1.1.1.2 | 22334 | 2.2.2.3 | 80 | TCP | IExplorer.exe |

Context: AppID, Application Name, Application Version, User ID, Group ID, Threat Level, Resource Consumption, ...

*Figure 3*

| ID | Priority | Application | Action | Options |
|---|---|---|---|---|
| 1 | 1000 | IExplorer.exe | No Action | N/A |
| 2 | 10001 | Firefox.exe | encrypt/ unencrypt | gzip |

*Figure 10*

CONTEXT AWARE MIDDLEBOX SERVICES AT DATACENTER EDGE

BACKGROUND

Middlebox services have historically been hardware appliances that are implemented at one or more points in a network topology in an enterprise or a datacenter. With the advent of software defined networking (SDN) and network virtualization, traditional hardware appliances do not take advantage of the flexibility and control that is provided by SDN and network virtualization. Accordingly, in recent years, some have suggested various ways to provide middlebox services on hosts that take advantage of the rich contextual data that can be captured for each data message flow on the host. However, middlebox services not acting on the host have not taken advantage of the rich contextual data available to services provided on the hosts.

BRIEF SUMMARY

Some embodiments of the invention provide a novel architecture for capturing contextual attributes on host computers that execute one or more machines and providing the captured contextual attributes to middlebox service engines executing at the edge of a physical datacenter. In some embodiments, the middlebox service engines run in an edge host (e.g., an NSX Edge) that provides routing services and connectivity to external networks (e.g., networks external to an NSX-T deployment). The machines are virtual machines (VMs) in some embodiments, containers in other embodiments, or a mix of VMs and containers in still other embodiments. In some embodiments, the machines belong to a logical overlay network implemented by managed forwarding elements of the physical datacenter.

In addition to executing one or more machines on each host computer, some embodiments also execute a context engine and a software forwarding element (SFE). Through the GI agents of the machines on a host, the context engine of that host, in some embodiments, collects contextual attributes associated with network events and/or process events on the machines. As further described below, the context engine then provides the contextual attributes to the context header insertion processor, which, in turn, uses these contextual attributes to generate a header including data regarding the contextual attributes (a "context header") that is used to encapsulate a data message that is processed by the SFE.

In some embodiments, the context header insertion processor on a machine registers hooks (e.g., callbacks) with one or more modules (e.g., kernel-space modules or user-space modules) in the machine's operating system for all data messages processed by the SFE of the host. In some embodiments, the context header insertion processor of a host provides the generated context header in response to a callback from a port of the SFE executing on the host. The encapsulated data message is then forwarded to its destination by the SFE. In some embodiments, forwarding the data message includes a further encapsulation with network addresses in the physical network.

Upon occurrence of a new network connection event, the context engine identifies, through the GI, a network event identifier. The network event identifier provides a set of attributes pertaining to the network event. These network event attributes in some embodiments include a five-tuple identifier (i.e., source port and IP address, destination port and IP address, and protocol) of the requested network connection, process identifier of the process requesting the network connection, a user identifier associated with the requesting process, and a group identifier (e.g., an activity directory (AD) identifier) associated with the requesting process.

In some embodiments, the context engine directs the GI agent to collect from the OS modules additional process parameters that are associated with the process identifier (ID) that it received with the network event. These additional process parameters in some embodiments include the process name, the process hash, the process path with command line parameters, the process network connection, the process-loaded modules, and one or more process consumption parameters specifying the process' consumption of one or more resources of the machine (e.g., central processing unit consumption, network consumption, and memory consumption). Instead of using the process identifier to query the GI agent for additional process parameters associated with a network event, the context engine in other embodiments receives all the process parameters associated with a network event in one shot when the GI agent reports the network event to the context engine.

The context engine of some embodiments augments the contextual attributes that it receives from the GI agent with contextual attributes that it receives from other modules that execute on the host. For instance, in some embodiments, a deep packet inspection (DPI) module executes on the host. The context engine directs this DPI engine to examine data messages of a data message flow associated with a process ID to identify the type of traffic being sent in these data messages by the application associated with the process ID.

The identified traffic-type identity is today commonly referred to as the AppID. Also, currently there are a number of DPI modules that analyze messages of a data message flow to generate the AppID. In some embodiments, the context engine combines the AppID that it obtains for a network event with other context attributes that it identifies for this event (e.g., by using the event's five-tuple identifier to associate the AppID with the collected contextual attributes), in order to produce a very rich set of attributes that the middlebox service engines can then use to perform their services. This rich set of attributes provides true application identity (i.e., the application name, application version, application traffic type, etc.), based on which the middlebox service engines can perform their services.

Also, in some embodiments, a threat detection module executes on the host computer along with the context engine. Once the context engine obtains a set of process parameters that specify that a process has started on a machine or is sending data messages on the machine, the context engine in some embodiments provides one or more process parameters (e.g., process hash, application name, application version, AppID, other process parameters, etc.) to the threat detection module. This threat detection module then generates a threat level indicator (e.g., low, medium, high, etc.) for the identified process and provides this threat level indicator to the context engine. The context engine then provides this threat level indicator to one or more middlebox service engines, through the context header insertion processor, as another contextual attribute for performing middlebox services on a new process event or the data messages of a new network event; a middlebox service engine can use the threat level indicator as another attribute to identify service rules to enforce.

The context engine employs a push model in some embodiments to distribute the collected contextual attributes to the context header insertion processor, while it employs a pull model in other embodiments to distribute these attributes to the context header insertion processor. In the push model, the context engine populates a context table with the contextual attributes that it collects for a process event or a network event with the process's identifier and/or the network event's flow identifier (e.g., the flow's five-tuple identifier). In some embodiments, the context engine populates the context table with only the contextual attributes that are relevant for middlebox service engines active at the edge of the datacenter.

In the pull model, the context engine receives queries from a context header insertion processor for the contextual attributes that the context engine has collected for a particular process or network connection. In some embodiments, the context engine receives a process ID or a flow identifier (e.g., five-tuple identifier) with a query from the context header insertion processor, and uses the received identifier to identify the attribute set that it has to provide to the context header insertion processor. In some embodiments, the context engine generates a context token (also called a context tag) for the collection of attributes that are relevant for the middlebox service and provides this context token to the context header insertion processor for inclusion in the generated header. When the data message arrives at the edge host, the middlebox service engines extract the context token and use it to identify the contextual attributes that are relevant to the individual middlebox services.

Different embodiments use different types of context-based middlebox service engines. For instance, in some embodiments, the attribute-based middlebox service engines include (1) a firewall engine that performs context-based firewall operations on data messages sent by or received for the datacenter, (2) a load-balancing engine that performs context-based load-balancing operations to distribute the data message flows from the machines to different destination or service nodes in one or more destination/service node clusters operating in different datacenters, (3) an encryption engine that performs context-based encryption or decryption operations to encrypt data message from the machines, or to decrypt data messages received for the machines, and (4) a wide area network (WAN) optimization engine that performs operations to increase data transfer efficiencies across WANs (e.g., between resources in an on-premises network and resources in a public cloud network).

When a data message is received at an edge host, in some embodiments, the data message is first processed based on the outer, physical network addresses and then the context header is analyzed to identify context data. The context data, in some embodiments, includes contextual attributes or a context tag. Contextual attributes, either received in the context header or identified using the context tag, are stored, in some embodiments, on an edge host for use by the middlebox service engines executing on the edge host. After providing the middlebox services to the data message, the data message is forwarded to its destination. In some embodiments, forwarding the data message to its destination includes encapsulating the data message with additional header information (e.g., in a custom header) for transmission over a WAN to a second datacenter. In embodiments employing a peer middlebox service (e.g., WAN optimization, etc.) at the second data center, the encapsulation includes a header portion that indicates for the peer middlebox service the relevant context data (e.g., information indicating an action state and options relevant to that action, such as an encryption method used by a middlebox service to encrypt the data message) needed to provide the peer middlebox service. The header information (e.g., custom header), in some embodiments, includes contextual attributes or a context tag that is used by the peer middlebox service to identify the relevant context data.

In some embodiments, middlebox service engines provide services differently for data messages that include different contextual attributes or different context tags. For example, a WAN optimization engine in some embodiments applies high compression for a data message with a context tag identifying a recommended/approved browser while applying low or no compression for a data message with a context tag identifying a non-recommended/non-approved browser.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 3 illustrates a contextual data table of some embodiments.

FIG. 10 conceptually illustrates a set of rules that are stored in a context-based service rule storage for a WAN optimization middlebox service in some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel architecture for capturing contextual attributes on host computers that execute one or more machines and providing the captured contextual attributes to middlebox service engines executing at the edge of a physical datacenter. The machines are virtual machines (VMs) in some embodiments, containers in other embodiments, or a mix of VMs and containers in still other embodiments. In some embodiments, the machines belong to a logical overlay network implemented by managed forwarding elements of the physical datacenter.

Some embodiments execute a context header insertion processor that receives contextual attributes relating to network events and/or process events on the machines collected using a guest-introspection (GI) agent on each machine. In addition to executing one or more machines on each host computer, some embodiments also execute a context engine and a software forwarding element (SFE). Through the GI agents of the machines on a host, the context engine of that host, in some embodiments, collects contextual attributes associated with network events and/or process events on the machines. As further described below, the context engine then provides the contextual attributes to the context header insertion processor, which, in turn, uses these contextual attributes to generate a header including data regarding the contextual attributes (a "context header") that is used to encapsulate a data message that is processed by the SFE.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
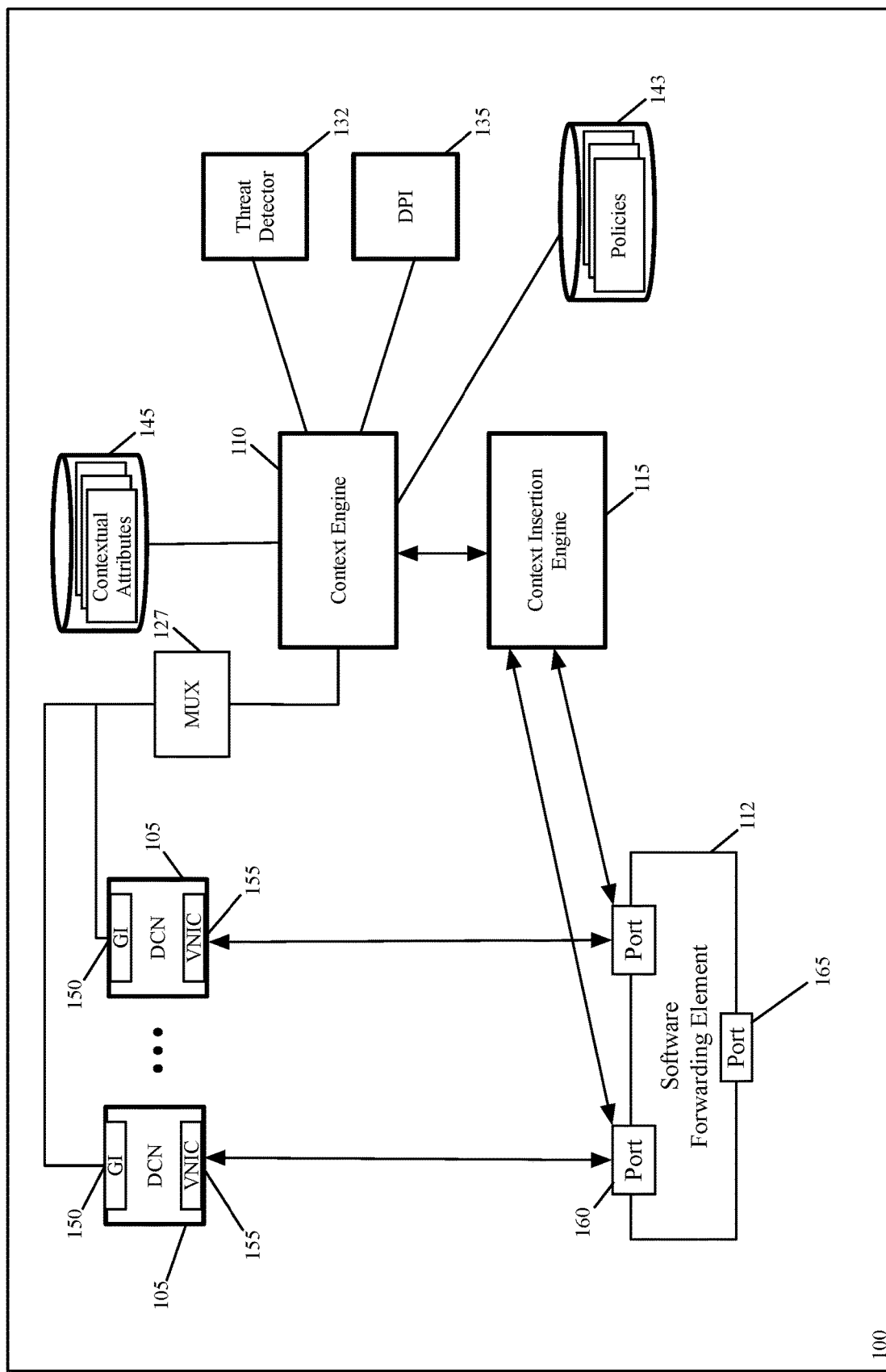
FIG. 1 illustrates a host computer that uses the context engine and context insertion engine of some embodiments of the invention.

FIG. 1 illustrates a host computer 100 that uses the context engine and context header insertion processor of some embodiments of the invention. As shown, the host computer 100 includes several data compute nodes 105, a context engine 110, a context insertion engine 115, a threat detector 132, a deep packet inspection (DPI) module 135, a MUX (multiplexer) 127, a contextual attribute storage 145, and a context-engine policy storage 143. In some embodiments, the context engine 110, the software forwarding element 112, the context insertion engine 115, the context-engine policy storage 143, and the MUX 127 operate in the kernel space of the hypervisor, while the DCNs 105 operate in the hypervisor's user space. In other embodiments, the context engine is a user space process.

The DCNs are endpoint machines executing on the host computer 100. The DCNs are virtual machines (VMs) in some embodiments, containers in other embodiments, or a mix of VMs and containers in still other embodiments. On each DCN, a GI agent 150 executes in order to collect contextual attributes for the context engine 110. In some embodiments, the context engine 110 collects contextual attributes from the GI agents 150 of the DCNs on its host through a variety of different ways. For instance, in some embodiments, the GI agent on a DCN registers hooks (e.g., callbacks) with one or more modules (e.g., kernel-space modules or user-space modules) in the DCN's operating system for all new network connection events and all new process events.

Upon occurrence of a new network connection event, the GI agent 150 receives a callback from its DCN's OS and based on this callback, provides a network event identifier to the context engine 110. The network event identifier provides a set of attributes pertaining to the network event. These network event attributes in some embodiments include attributes at layers 2 through 4 L2-L4 such as a five-tuple identifier (i.e., source port and IP address, destination port and IP address, and protocol) of the requested network connection, attributes at layer 7 (L7) such as a process identifier of the process requesting the network connection, a user identifier associated with the requesting process, and a group identifier (e.g., an activity directory (AD) identifier) associated with the requesting process. In some embodiments, all the communication between the context engine 110 and the GI agents 150 are relayed through the MUX 127. One example of such a mux is the mux that is used by the Endpoint Security (EPSec) platform of ESX hypervisors of VMware, Inc.

In some embodiments, the GI agents communicate with the MUX 127 through a fast communication channel (such as VMCI channel of ESX). In some embodiments, this communication channel is a shared memory channel. As mentioned above, the attributes collected by the context engine 110 from the GI agents 150 in some embodiments include a rich group of parameters (e.g., layer 7 parameters, process identifiers, user identifiers, group identifiers, process name, process hash, loaded module identifiers, consumption parameters, etc.)

As shown, each VM 105 also includes a virtual network interface card (VNIC) 155 in some embodiments. Each VNIC is responsible for exchanging messages between its VM and the software forwarding element (SFE) 112. Each VNIC connects to a particular port 160 of the SFE 112. The SFE 112 also connects to a physical network interface card (NIC) (not shown) of the host. In some embodiments, the VNICs are software abstractions created by the hypervisor of one or more physical NICs (PNICs) of the host.

In some embodiments, the SFE 112 maintains a single port 160 for each VNIC of each VM. The SFE 112 connects to the host PNIC (through a NIC driver (not shown)) to send outgoing messages and to receive incoming messages. In some embodiments, the SFE 112 is defined to include a port 165 that connects to the PNIC's driver to send and receive messages to and from the PNIC. The SFE 112 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 160 or 165, which directs the message to be supplied to a destination VM or to the PNIC).

In some embodiments, the SFE 112 is a software switch, while in other embodiments it is a software router or a combined software switch/router. The SFE 112 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts, both within a datacenter and across datacenters. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (May 8, 2013), VXLAN: A Framework for Overlaying Virtualized Layer 2 Networks over Layer 3 Networks, IETF.

The ports of the SFE 112 in some embodiments include one or more function calls to one or more modules that implement special input/output (I/O) operations on incoming and outgoing messages that are received at the ports. Examples of I/O operations that are implemented by the ports 160 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs 155, port 165, etc.) implement the I/O function call operations instead of, or in conjunction with, the ports 160. In some embodiments, one or more of function calls of the SFE ports 160 can be to context insertion engine 115 that generates context headers (e.g., headers including context data) as discussed in relation to FIG. 4.

In some embodiments, the context engine directs the GI agent 150 to collect, from the OS modules, additional process parameters that are associated with the process identifier (ID) that it received with the network event. These additional process parameters in some embodiments include the process name, the process hash, the process path with command line parameters, the process network connection, the process-loaded modules, and one or more process consumption parameters specifying the process' consumption of one or more resources of the machine (e.g., central processing unit consumption, network consumption, and memory consumption). Instead of using the process identifier to query the GI agent 150 for additional process parameters associated with a network event, the context engine 110 in other embodiments receives all the process parameters associated with a network event in one shot when the GI agent reports the network event to the context engine.

The OS of the DCN in some embodiments holds up a new network event (i.e., does not start sending data messages for the network event) until the GI agent 150 on that DCN directs it to proceed with processing the network event. In some of these embodiments, the GI agent 150 only allows the OS to proceed with processing the network event after the context engine 110 has collected all the needed attributes for this event (e.g., after receiving a message from the context engine that specifies that it has received all the process or network attributes that it needs for the new network event).

In some embodiments, the context engine 110 uses the process hash that it receives from the GI agent 150 to identify the name and version of the application (i.e., the software product) to which the process belongs. To do this, the context engine 110 in some embodiments stores process hashes and associated application names/versions, compares the process hash that it receives from the GI agent with the stored process hashes to identify a matching hash, and then uses the application name/version of the matching hash as the application name and version of the process associated with the event.

In some embodiments, the context engine 110 obtains the process hashes and application names/versions from one or more network or compute managers, which may operate on another device or computer. In other embodiments, the context engine provides the hash associated with a process identifier to a network or compute manager, which then matches this hash to its process hash records and provides the application name/version of the associated process to the context engine. Once the context engine 110 obtains the application name/version associated with a network event, it can provide the name and version attributes to the context insertion engine, which can use this information (i.e., the application name and/or version) to identify the context data to include in the data message.

Upon occurrence of a process event on a DCN 105, the DCN's GI agent 150 in some embodiments receives a callback from the DCN's OS and based on this callback, provides a process event identifier to the context engine 110. The process event identifier provides a set of attributes pertaining to the process event. This set of attributes includes the process identifier in some embodiments. In some embodiments, this set also includes a user identifier and/or a group identifier (e.g., an activity directory (AD) identifier).

In some embodiments, the GI agent provides all the process parameters (e.g., process identifier, user ID, group ID, process name, process hash, loaded module identifiers, consumption parameters, etc.) associated with a process event to the context engine when it reports the process event to the context engine. In other embodiments, the context engine directs the GI agent to collect from the OS modules additional process parameters that are associated with the process identifier that context engine received with the process event. These additional process parameters in some embodiments are the same (e.g., process name, process hash, loaded module identifiers, consumption parameters, etc.) as the process parameters mentioned above for reported network events.

The context engine 110 of some embodiments augments the contextual attributes that it receives from the GI agents 150 with contextual attributes that it receives from other modules that execute on the host. The DPI module 135 (also referred to as the deep packet inspector) and the threat detector 132 (also referred to as the threat inspection module) are two such modules that provide contextual attributes to augment those that the context engine collects from the GI agents 150. In some embodiments, a DPI module is directed by the context engine 110 to examine data messages of a data message flow associated with a process ID to identify the type of traffic being sent in these data messages by the application associated with the process ID.

The identified traffic-type identity is today commonly referred to as the AppID. Also, currently there are a number of DPI modules that analyze messages of a data message flow to generate the AppID for the data message flow. In some embodiments, the context engine combines the AppID that it obtains for a network event with other context attributes that it identifies for this event, in order to produce a very rich set of attributes that the middlebox service at the edge of a datacenter can use to provide the service. This rich set of attributes provides true application identity (i.e., the application name, application version, application traffic type, etc.), based on which the middlebox services can perform their services. In some embodiments, the context engine 110 uses a network event's five-tuple identifier to associate the AppID for this event's data message flow with the contextual attributes that the context engine collects from the GI agent of the DCN associated with the data message flow (e.g., of the DCN from which the data message flow emanates).

The threat detector 132 provides a threat level indicator that specifies the threat level associated with a particular application that is executing on a DCN. Once the context engine obtains a set of process parameters that specify that a process has started on a machine or is sending data messages on the machine, the context engine in some embodiments provides one or more process parameters (e.g., process hash, application name, application version, AppID, other process parameters, etc.) to the threat detection module.

This threat detection module then generates a threat level indicator (e.g., low, medium, high, etc.) for the identified process and provides this threat level indicator to the context engine. In some embodiments, the threat detector assigns a threat score to an application running on a DCN based on various application behavioral factors, such as (1) whether it does poor input validation, (2) whether it passes authentication credentials over unencrypted network links, (3) whether it uses weak password and account policies, (4) whether it stores configuration secrets in clear text, (5) whether it can transfer files, (6) whether the application is known to propagate malware, (7) whether the application is purposely evasive, (8) whether the application has known vulnerabilities, etc. In some embodiments, the threat detector is a third-party whitelisting application, such as the Bit9.

The context engine in some embodiments provides the threat level indicator produced by the threat detector 132 to one or more middlebox service engines (using the context insertion engine) as another contextual attribute for performing services on a new process event or the data messages of a new network event; a middlebox service engine can use the threat level indicator as another attribute to identify service rules to enforce.

The context engine 110 stores the contextual attributes that it collects for network events and process events in the attribute storage 145. In some embodiments, the context engine stores each set of contextual attributes with one or more network event identifiers and/or process identifiers. For example, in some embodiments, the context engine 110 stores the collected contextual attributes for a new process event with the process identifier, or with a reference to this identifier. The context engine then uses the process identifier to provide the collected context attributes to context insertion engine 115 that inserts the relevant information into data messages related to the process event for use by a middlebox service engine.

The context engine in some embodiments stores the collected context attributes for a new network connection event with the five-tuple identifier of the network connection event, or with a reference to this five-tuple identifier. In some of these embodiments, the context engine provides to the context insertion engine the context attributes for a network event along with this event's five-tuple identifier. The data messages for this network event will use this five-tuple identifier, and hence the context insertion engine can use the supplied five-tuple identifier to identify the context attributes associated with a data message flow.

The context engine employs a push model in some embodiments to distribute the collected contextual attributes to the context insertion engine 115, while in other embodiments the context engine 110 employs a pull model to distribute these attributes to the context insertion engine 115. In the push model, the context engine 110, in some embodiments, distributes, to a context insertion engine 115, the contextual attributes that it collects for a process event or a network event with the process's identifier and/or the network event's flow identifier (e.g., the flow's five-tuple identifier).

In some embodiments, the context engine distributes to the context insertion engine only the contextual attributes that are relevant for middlebox service engines that are identified as being relevant to the data message. In other words, in these embodiments, the context engine compares each collected attribute in a set of collected attributes (e.g., for a network event or a process event) with a list of attributes specified by a middlebox service's service rules and discards each collected attribute that is not specified by at least one middlebox service's service rules. In some embodiments, each middlebox service's service rules are stored in the policy storage 140. The context engine then provides to the context insertion engine only the subset of collected attributes (in the set of collected attributes) that is being used by at least one middlebox service's service rules. In other embodiments, the middlebox services perform this filtering operation to discard the contextual attributes that are not needed.

In the pull model, the context engine receives queries from a context insertion engine for the contextual attributes that the context engine has collected for a particular process or network connection. In some embodiments, the context engine receives a process ID or a flow identifier (e.g., five-tuple identifier) with a query from the context insertion engine and uses the received identifier to identify the attribute set that it has to provide to the context insertion engine.

In some embodiments, the context engine generates a context token (also called a context tag) for the collection of attributes that are relevant for the middlebox service engines and provides this context token to the context insertion engine to include in the data message's header. The middlebox service engine that receives the data message at the edge host extracts the context token and identifies the contextual attributes associated with the context token.

In some embodiments, one or more other modules (e.g., ports 160) on the host 100 intercept data messages from an egress datapath and call the context insertion engine 115 for the context insertion engine to generate and insert context data into a header of the data messages as will be discussed further in relation to FIG. 4.

Figure 2:
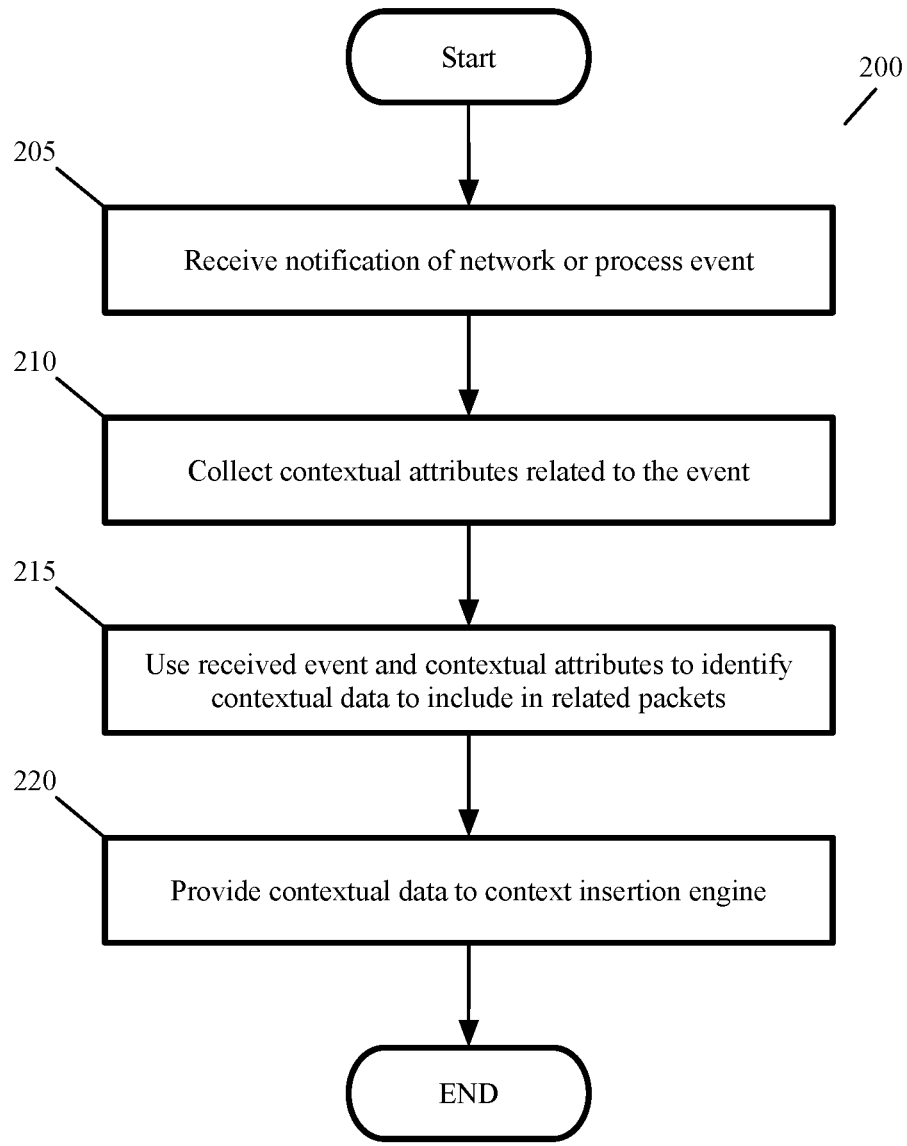
FIG. 2 conceptually illustrates a process for collecting contextual attributes and providing contextual data relating to the contextual attributes to a context header insertion processor.

FIG. 2 conceptually illustrates a process 200 for collecting contextual attributes and providing contextual data relating to the contextual attributes to a context header insertion processor. In some embodiments, process 200 is performed by a context engine (e.g., context engine 110). Process 200 begins by receiving (at 205) a notification of a new network or process event from a GI agent (e.g., GI agent 150) of a VM (e.g., DCN 105). After receiving the notification, the process 200 collects (at 210) contextual attributes related to the event.

As described above, the context engine 110 in some embodiments interacts (at 210) with the reporting GI agent 150 to collect additional information regarding a reported event. The GI agent in some embodiments interacts with the network stack and/or process subsystem in the VM's OS kernel space to collect contextual attributes regarding a process or network event. The GI agent in some embodiments also collects this information from user-space modules (e.g., a user mode dynamic-link library, DLL) that operate in user-space process (e.g., a VMtool.exe) to collect contextual attributes. On VM's using Microsoft Windows, the GI agent in some embodiments registers hooks in the Windows Filtering Platform (WFP) to obtain network events, while registering in the Window's Process Subsystem to collect process related attributes. In some embodiments, the GI agent hook is at the Application Layer Enforcement (ALE) layer of WFP, so that it can capture all socket-connection requests from application processes on the VM.

In some embodiments, the context engine 110 interacts with the management or control plane to collect contextual attributes, and/or to receive records that it can examine to identify contextual attributes for identified network or process events. In some of these embodiments, the context engine interacts with a management or control plane proxy (that operates on its host) in order to obtain data from the management or control plane servers that operate outside of the host. In some of these embodiments, the context engine operates in the kernel space.

After collecting the contextual attributes at 210, the process uses (at 215) the attributes of the received event or the contextual attributes collected for the received event to identify a set of contextual data to include in related data messages. In some embodiments, the identification is based on a set of policies stored in a policy storage 143. In some embodiments, the context engine interacts with a management or control plane proxy (that operates on its host) in order to obtain data from the management or control plane servers that operate outside of the host to identify the contextual data necessary for middlebox services required by the related data messages.

Once the relevant context data has been identified (at 215), the process provides (at 220) the relevant context data to the context insertion engine 115. In some embodiments, this is in response to a call from the context insertion engine.

In some embodiments, providing (at 220) the contextual data includes populating a contextual data table that is subsequently accessed by the context insertion engine. In some embodiments, the contextual data is identified for a particular network or process event in the contextual data table by a set of header fields (e.g., a five-tuple) of data messages related to the event.

FIG. 3 illustrates a contextual data table 300 of some embodiments. Contextual data table 300 includes fields for source IP address 305, source port 310, destination IP address 315, destination port 320, protocol 325, and context (i.e., contextual data) 330. Fields 305-325 represent the five-tuple header values that are used to identify the relevant contextual data for a data message in some embodiments. Context field 330, in some embodiments is a set of fields that contain contextual data such as an AppID, an application name, and application version, a user ID, a group ID, a threat level, resource consumption, etc.

Figure 4:
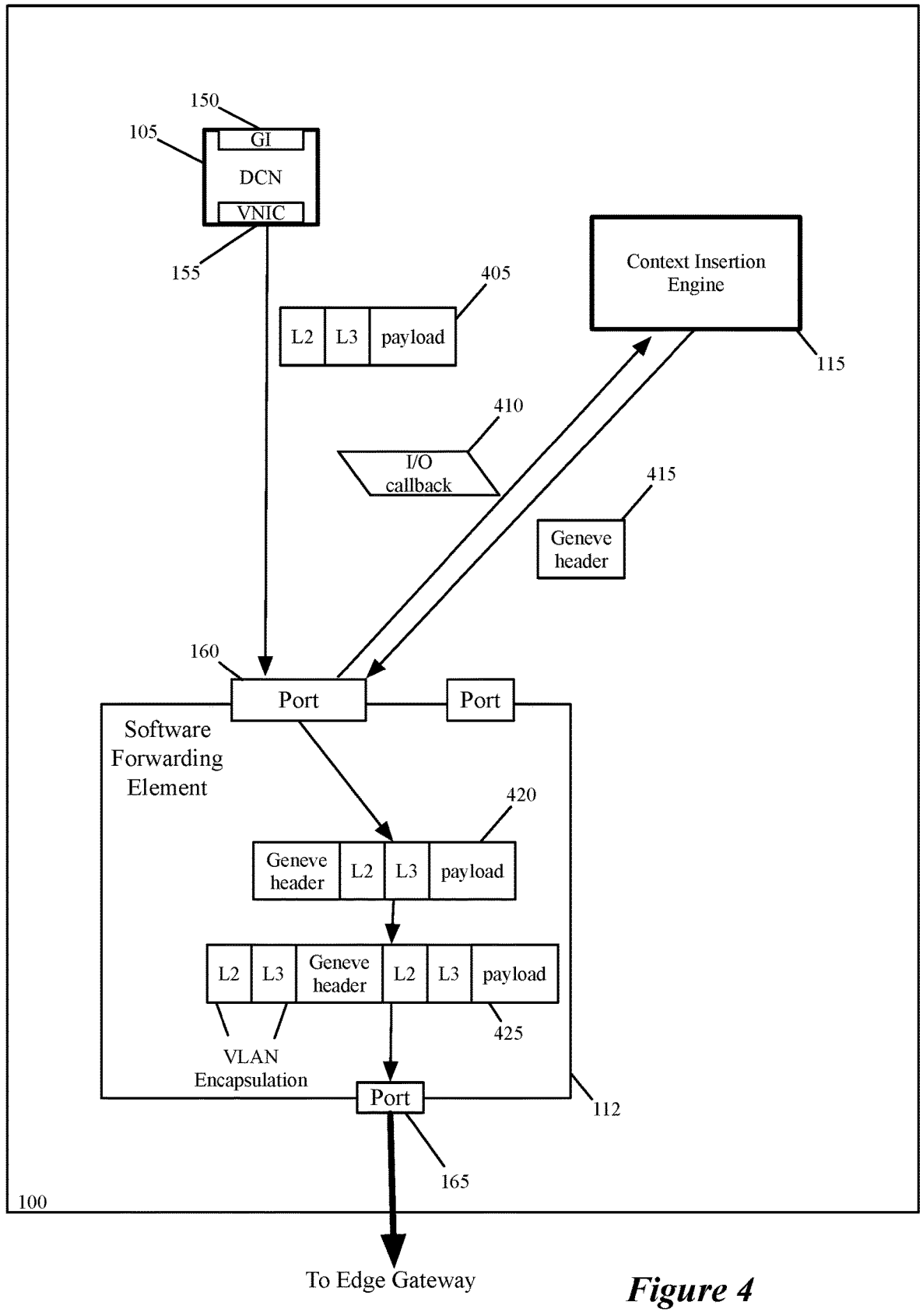
FIG. 4 illustrates a set of operations for appending contextual data to a data message.

FIG. 4 illustrates a set of operations for appending contextual data to a data message. FIG. 4 depicts the host 100 of FIG. 1 with many of the elements removed for clarity. The operations depicted in FIG. 4 are described in relation to FIGS. 5 and 6 which conceptually illustrate, respectively, processes 500 and 600 that are performed by a software forwarding element 160 and context insertion engine 115, respectively.

Figure 5:
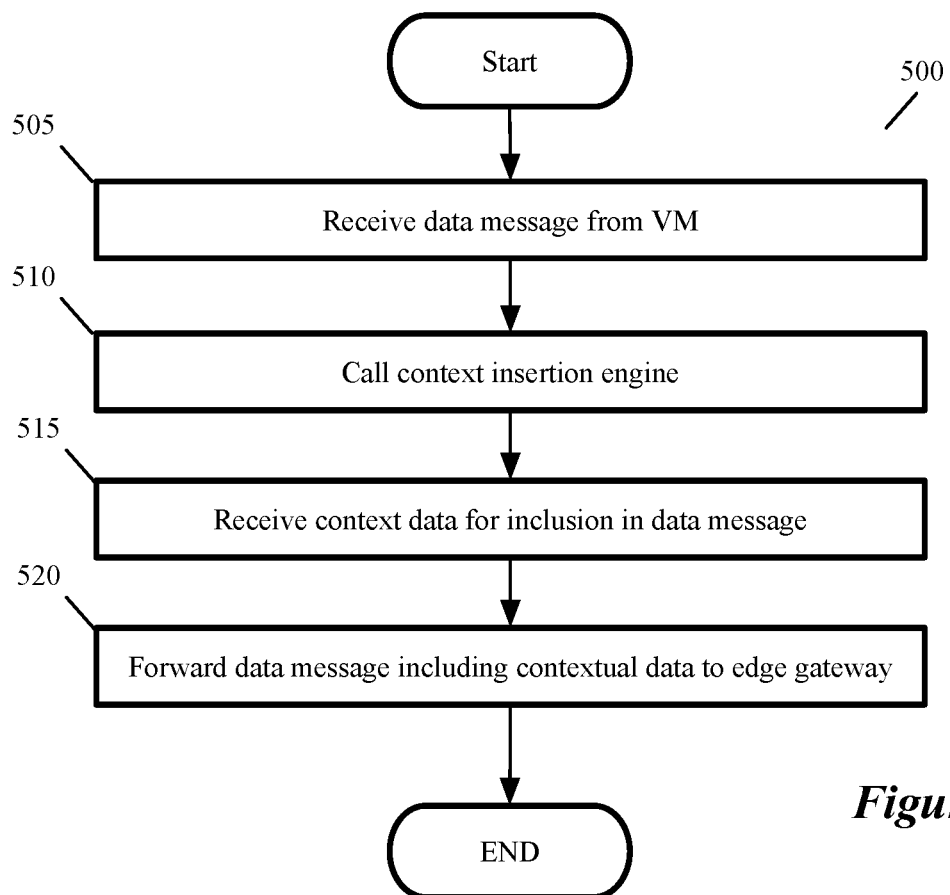
FIG. 5 conceptually illustrates a process for appending contextual data to a data message in some embodiments.

FIG. 4 depicts a data message 405 that is sent from a VNIC 155 of virtual machine 105 to a port 160 of SFE 112. The data message 405 includes a set of data link layer (e.g., MAC) and network layer (e.g., IP) addresses and a payload that represents the content of the data message. In some embodiments, the data message also includes other header values (e.g., port information). FIG. 5 conceptually illustrates a process 500 for appending contextual data to a data message in some embodiments. Process 500 is performed, in some embodiments, by a software forwarding element 160. Process 500 begins by receiving (at 505) data message 405 at port 160.

Once the data message has been received (at 505) the process calls (at 510) the context insertion engine as part of an I/O process. FIG. 4 depicts the call 410 being made by port 160 but, in some embodiments, the call is made by the VNIC 155 before the data message is forwarded to port 160. The call to the context insertion engine 115, in some embodiments, is based on a prior registration of the context insertion engine 115 to receive the callback. In some embodiments, the call to the context insertion engine 115 includes a set of data message attributes (e.g., the five-tuple header information) that the context insertion engine 115 uses to identify the related contextual data.

Figure 6:
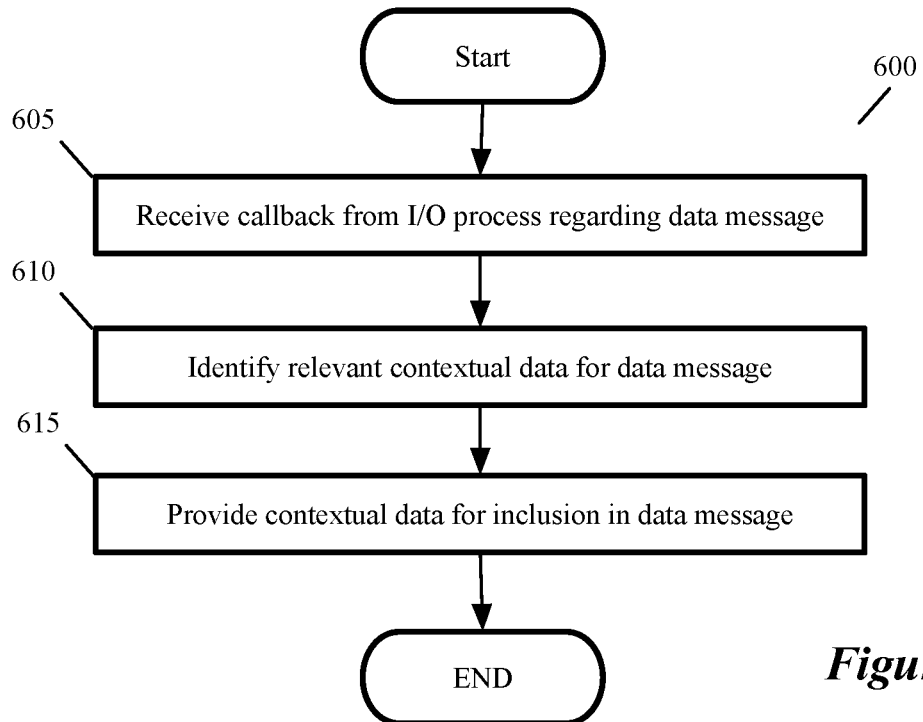
FIG. 6 conceptually illustrates a process that the context insertion engine performs as part of the process depicted in FIG. 4 beginning when the context insertion engine receives the callback from sent from the I/O process.

FIG. 6 conceptually illustrates a process 600 that the context insertion engine performs as part of the process depicted in FIG. 4 beginning when the context insertion engine 115 receives (at 605) the callback from sent from the I/O process (at 510). As discussed above, the callback, in some embodiments is based on a previous registration of the context insertion engine with the I/O process or module responsible for calling the context insertion engine and contains information used to identify the contextual data related to the received data message.

After receiving the callback (at 605), the process identifies (at 610) the relevant contextual data for the data message. In some embodiments, the relevant contextual data is identified by searching the contextual data table populated by the context engine 110. Searching the contextual data table, in some embodiments, includes comparing data message attributes to data message attributes of events captured by the GI agent and processed by the context engine for inclusion in the contextual data table. In some embodiments, the data message attributes include the five-tuple header values as depicted in FIG. 3. The identified contextual data is the context data associated with the matching five-tuple (e.g., the context data in field 330 of contextual data table 300). In some embodiments, the context insertion engine 115 communicates with the context engine 110 to identify the contextual data associated with the data message. In some embodiments, context insertion engine 115 forwards the data message attributes it receives from the I/O process to context engine 110 and receives the relevant contextual data from context engine 110.

Once the contextual data has been identified (at 610), the contextual data is provided (at 615) to the process (e.g., port 160) which called the context insertion engine 115. As depicted in FIG. 4, in some embodiments, the contextual data is provided as a header (e.g., generic network virtualization encapsulation (GENEVE) header 415) to append to the data message before forwarding the data message to a physical NIC. In some embodiments, the contextual information contained in the contextual data table is sent to the process which called the context insertion engine 115 for inclusion in a header (e.g., a GENEVE header) generated by the calling process. Process 600 then ends.

Once the context insertion engine 115 has sent (at 615) the contextual data, process 500 receives (at 515) the contextual data sent by the context insertion engine 115. As discussed above, the received contextual data, in some embodiments, is a header to append to the data message and, in other embodiments, is contextual data to include in a header generated by the calling process. In some embodiments, the received header is appended to the data message to produce a data message (e.g. data message 420).

Once the contextual data is received and included in a first header, the data message is forwarded (at 520) to the edge gateway. In some embodiments, forwarding the data message includes appending a further header to the data message. The further header, in some embodiments, is a VLAN or VXLAN encapsulation header (as for data message 425) to allow the data message to traverse a physical network while maintaining the logical separation from other logical overlay networks. In some embodiments, forwarding the data message to the edge gateway includes providing the encapsulated data message (e.g., data message 425) to a physical NIC of host 100 to be sent out over the physical network of a datacenter. Process 500 then ends.

In some embodiments, context-aware middlebox services are also provided at a machine's 105 host 100 as described in U.S. patent application Ser. No. 15/650,251, now published as U.S. Patent Publication 2018/0181423 which is hereby incorporated by reference.

Figure 7:
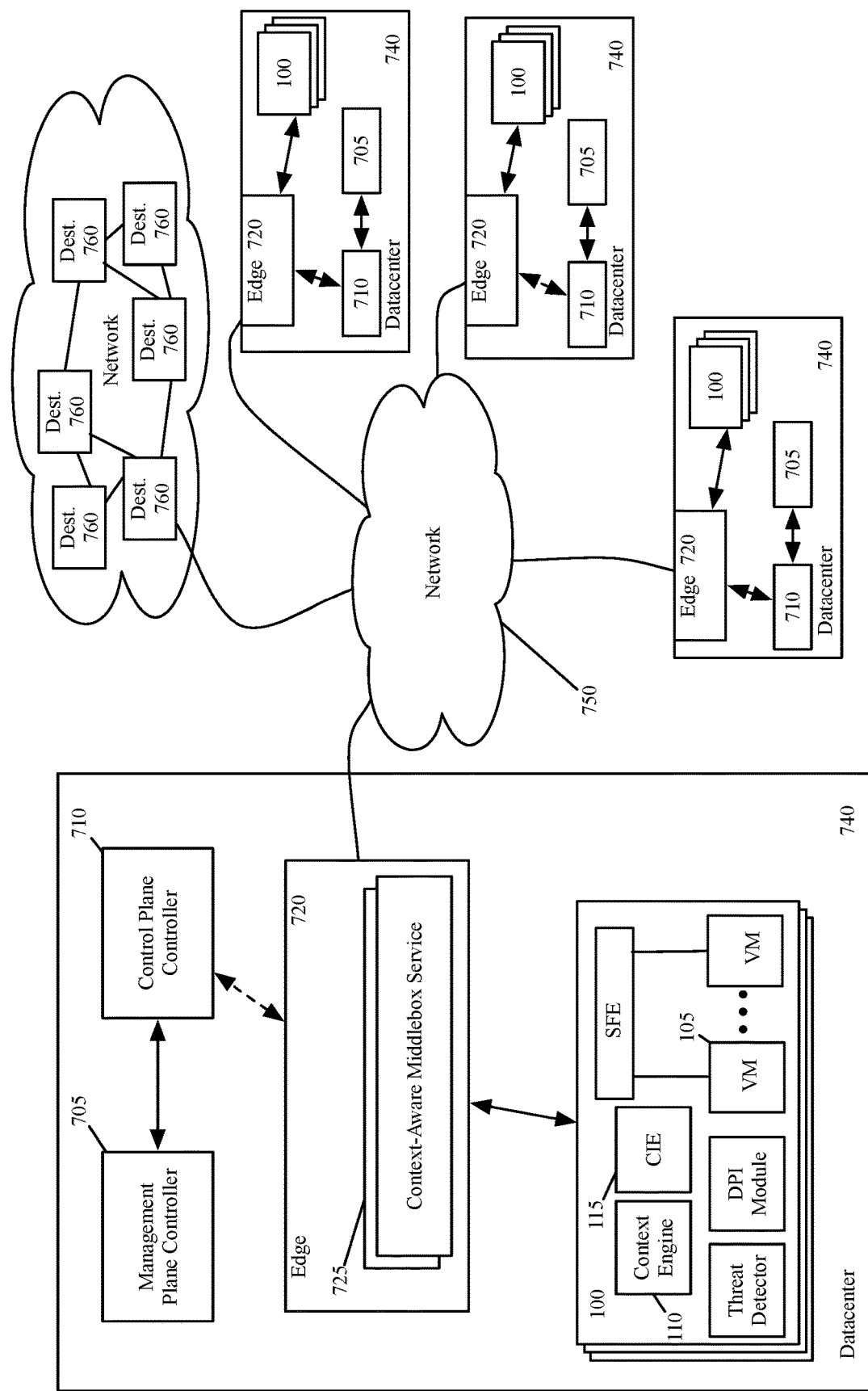
FIG. 7 illustrates a set of datacenters that include a set of hosts as described in relation to FIG. 1 and an edge host hosting a set of context-aware middlebox services.

FIG. 7 illustrates a set of datacenters 740 that includes a set of hosts 100 as described in relation to FIG. 1 and an edge host 720 hosting a set of context-aware middlebox service engines 725. FIG. 7 also depicts external networks 750, which can provide connectivity between datacenters or include destination machines 760. Each datacenter 740 depicted in FIG. 7 also includes a set of controllers, including management plane controllers 705 and control plane controllers 710. In some embodiments, the controllers 705 and 710, respectively, make up a cluster of management and control plane controllers. In some embodiments, only some datacenters implement controllers.

Middlebox service configurations are defined in the management plane, in some embodiments based on user input, and are distributed to the edge hosts for enforcement. For instance, an administrator, in some embodiments, specifies optimization rules for a WAN optimizer middlebox service engine that define which application traffic will be optimized and the method of optimization (e.g., sanctioned applications are provided with the highest quality of bandwidth, or large file transfers initiated by trusted applications are compressed with a high compression algorithm). In some embodiments, the management plane controller 705 communicates the middlebox service configurations to the control plane controllers 710 for the control plane controllers 710 to provide control plane data to the edge hosts 720 to configure the edge hosts 720 to implement the desired middlebox services according to the middlebox service configurations. In some embodiments, messages from the management plane controller 705 to the control plane controller 710 are sent via RabbitMQ.

The control plane controllers 710, in some embodiments, communicate with each other to maintain consistent middlebox service configuration data. In some embodiments, consistency is necessary for proper functioning of the middlebox services (e.g., parameters such as encryption type or protocol must be consistent across edge hosts for WAN optimization to be able to decompress a compressed data message). In some embodiments, consistency is desirable but not critical. For each different middlebox service implemented by the edge hosts, the control plane cluster, in some embodiments, uses a different mechanism or schedule for maintaining consistent middlebox service configuration data across the control plane controllers. In some embodiments, the middlebox service configuration data (including rules) are sent from the control plane controller 710 to edge hosts via an NSX channel (e.g., an existing channel that delivers messages between the control plane cluster and an edge host). The rules, in some embodiments, are stored in a NestDB on the edge host 720 from which the middlebox service engines 725 can retrieve them.

In FIG. 7, the DCNs 105 are VMs that execute on a hypervisor. In some embodiments, the VMs 105 serve as data end points in the datacenter. Examples of such machines include webservers, application servers, database servers, etc. In some cases, all the VMs belong to one entity, e.g., an enterprise that operates the host. In other cases, the host 100 operates in a multi-tenant environment (e.g., in a multi-tenant data center), and different VMs 105 may belong to one tenant or to multiple tenants.

Figure 8:
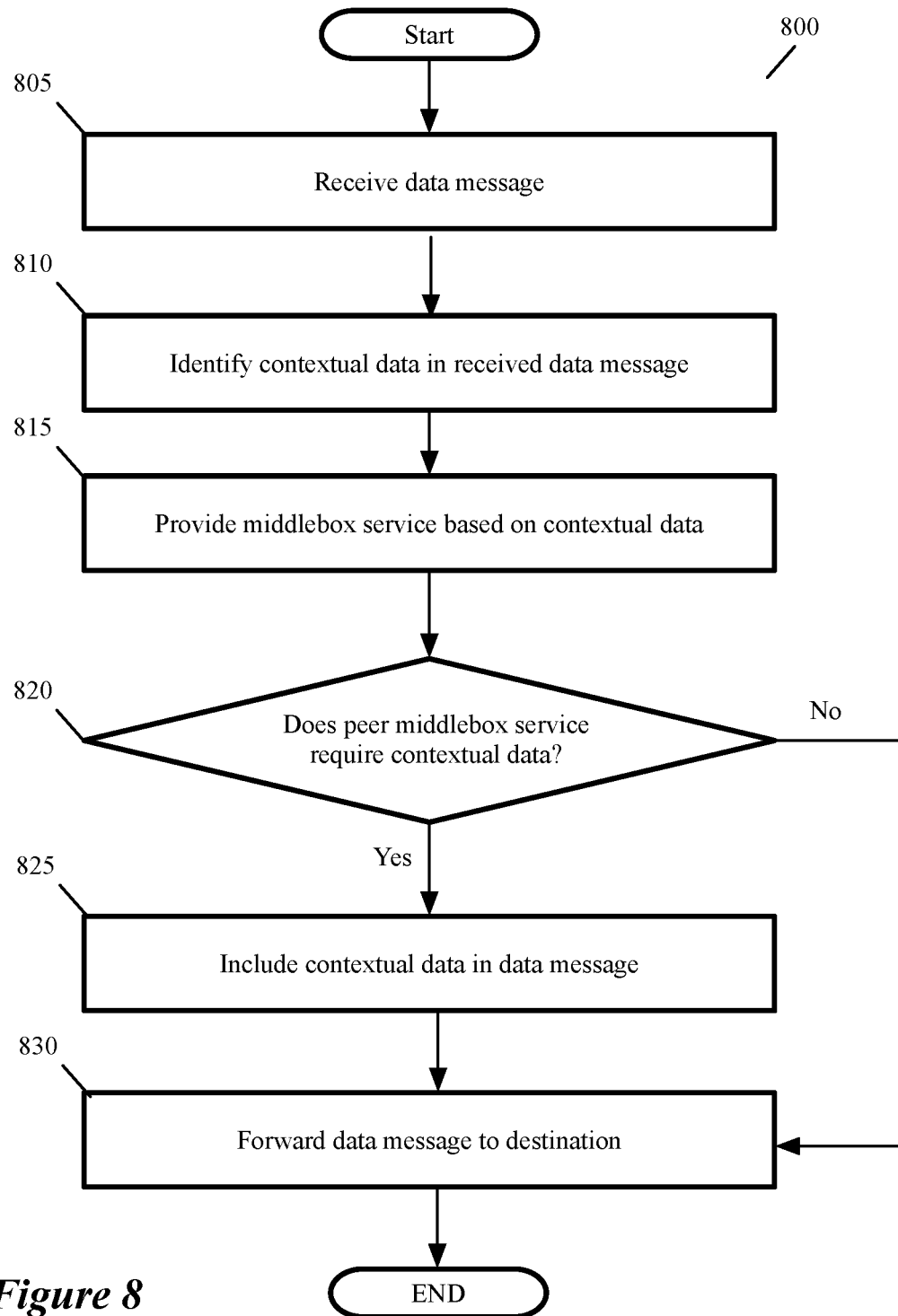
FIG. 8 conceptually illustrates a process that a context-aware middlebox service or a host executing a context-aware middlebox service performs to provide the context-aware middlebox service.
Figure 9:
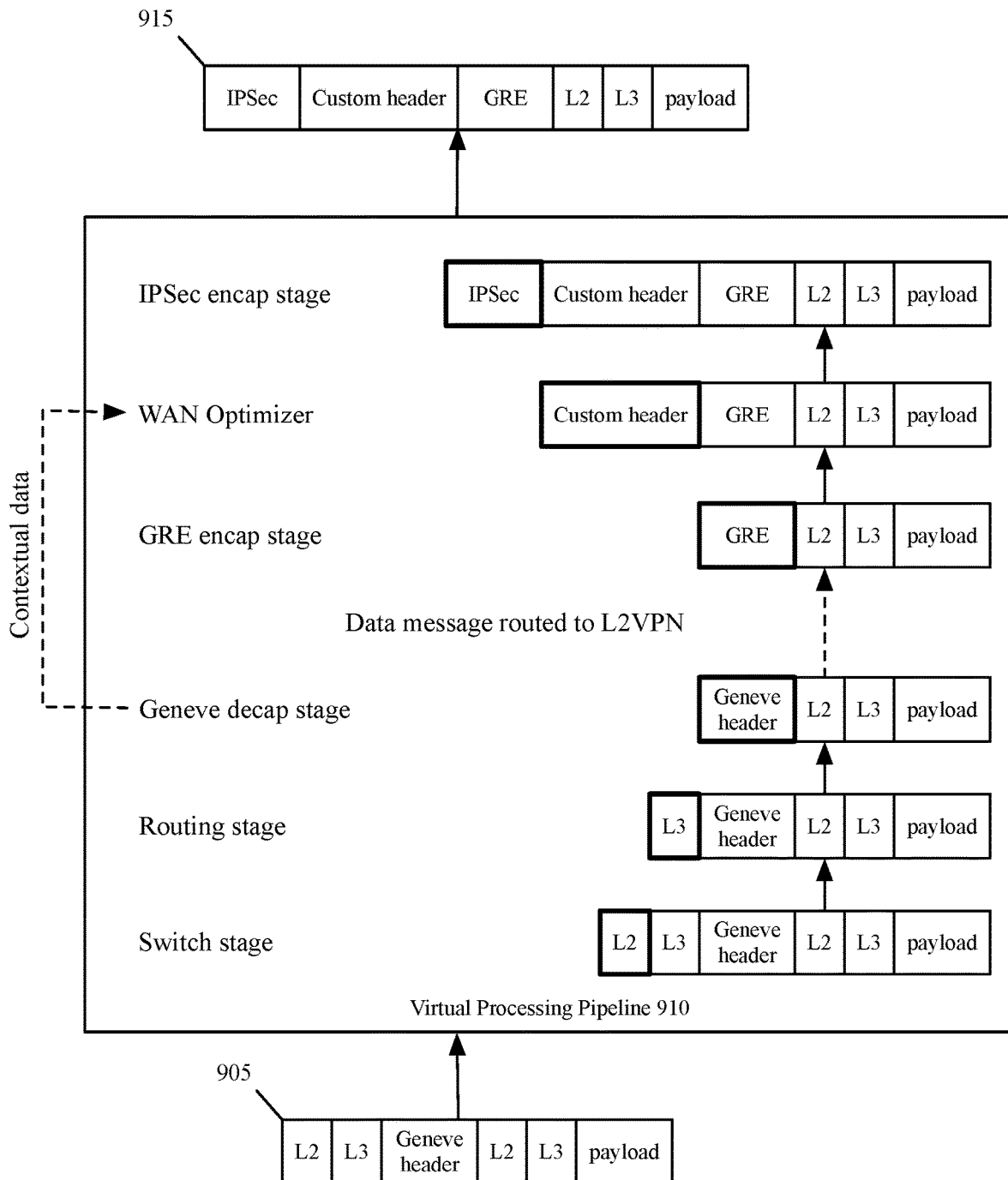
FIG. 9 illustrates a set of packet processing stages in a virtual packet processing pipeline.

To perform its service operation for a data message flow, a context-aware middlebox service engine 725, in some embodiments, uses context data included in the data message to determine the action to perform on the data message as part of providing the middlebox service. In some embodiments, middlebox service engines execute on a same physical device as an edge gateway (i.e., edge host 720) and each of the middlebox service engines and the edge gateway are implemented using virtual machines (service virtual machines), containers, or software modules executing on the physical device. In other embodiments, edge gateways and middlebox service engines execute on separate physical devices (not shown). In some embodiments, each physical device is one of a standalone device for performing a particular gateway or middlebox function or a device executing a set of virtual machines, containers or software modules to implement the gateway or middlebox function. The specific steps of the process will be described in relation to FIGS. 8 and 9 that illustrate, respectively, a context-aware middlebox service process and a set of packet processing stages in a virtual packet processing pipeline 910. FIG. 8 conceptually illustrates a process 800 that a context-aware middlebox service or a host executing a context-aware middlebox service performs to provide the context-aware middlebox service. The process receives (at 805) a data message. In some embodiments, the data message is received by the host with an encapsulation for routing the packet through the physical network to the host, with the context data included in an inner header (e.g., GENEVE header) as depicted in data message 905 of FIG. 9. In such embodiments, the host performs switching and routing operations based on the layer 2 and 3 addresses in the outer header as shown in FIG. 9.

Once the outer header has been processed and removed, the process identifies (at 810) the context data included in the inner (e.g., GENEVE) header. In some embodiments, the context data (e.g., contextual attributes or context token) are stored for later access by the middlebox service engine or provided to the middlebox service engine. As indicated in FIG. 9, identifying the context data in the data message, in some embodiments, is part of a general inner (GENEVE) header/encapsulation processing operation. Once the inner header has been processed, the inner (logical) network addresses are processed to determine a destination. In the example of FIG. 9, the data message's destination is identified as being behind a tunnel endpoint of a layer 2 VPN (L2VPN) tunnel to which the data message is routed. The data message is prepared for sending to the L2VPN destination with, in the depicted embodiment, a generic routing encapsulation (GRE) header. In some embodiments, the GRE header is instead a GENEVE header that has the contextual information extracted from the original GENEVE header reinserted for an intermediate or destination machine to use to process (e.g., perform a service, or forward) the data message.

Once the data message has been encapsulated with the GRE header, process 800 provides (at 815) the middlebox service based on the contextual data it identified from the data message header. In some embodiments, the middlebox service 725 uses the contextual data to match to contextual attributes recited by service rules in a context-based service rule storage. If no service rule specifies contextual data matching the contextual data identified in the header, no action is taken. In some embodiments, a default service rule is specified that matches any contextual data (e.g., specified as a set of wildcard values) and specifies a default action (e.g., no action) so that all data messages match at least one service rule. One of ordinary skill in the art will appreciate that certain middlebox services are performed before encapsulation with the GRE header.

Figure 10:
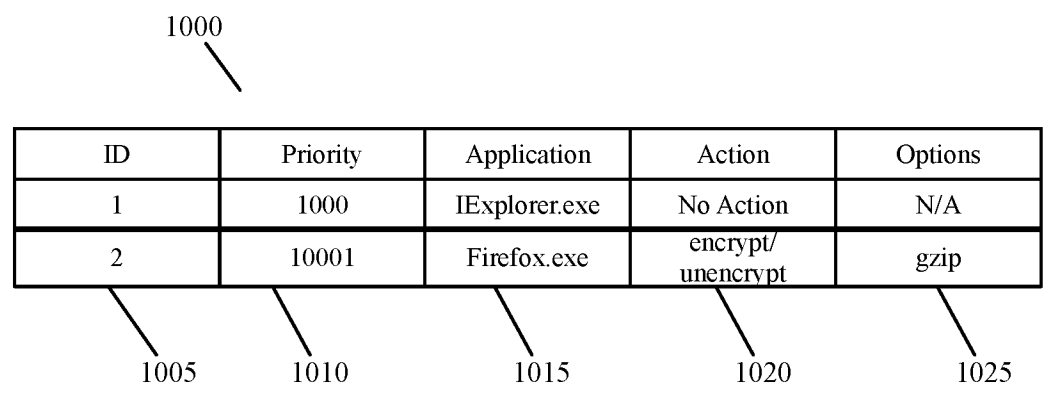

FIG. 10 conceptually illustrates a set of rules that are stored in a context-based service rule storage 1000 for a WAN optimization middlebox service in some embodiments. FIG. 10 depicts a set of service rules that specify a rule identifier (ID) 1005, a priority 1010, an application 1015, an action 1020, and a set of options 1025. Rule ID 1005 is a unique number given to a rule. Rule ID 1005, in some embodiments, is provided by the control plane controller and is consistent across all hosts, in other embodiments, rule ID 1005 is locally unique within the host. Priority 1010 is used to determine the order in which rules are evaluated. Application 1015 is a specific contextual attribute used in this WAN optimization example, but is only one example of a set of contextual attributes that are used in the context-based service rule storage. Action 1020 defines the action taken by the middlebox service for data messages with contextual attributes matching those specified in the rule (e.g., application 1015). Options 1025 defines additional information corresponding to the action (e.g., the compression protocol), in some embodiments.

As mentioned above, application 1015 of a service rule in some embodiments represents a specific example of a contextual attribute specified in a rule, but in other embodiments, the rule may specify one or more other contextual attributes that are not L2-L4 header parameters (e.g., are L7 parameters, process identifiers, user identifiers, group identifiers, process name, process hash, loaded module identifiers, consumption parameters, etc.). In some embodiments, a rule also specifies L2-L4 header parameters. Also, in some embodiments, one or more contextual attributes in a rule can be specified in terms of an individual value or a wildcard value. Also, in some embodiments, a rule can specify a set of individual values or a group identifier, such as a security group identifier, a compute construct identifier, a network construct identifier, etc.

In some embodiments, to match received contextual data with the rules, the middlebox services (or another module of the edge host) compare the received contextual data with the attribute specification of the service rules stored in the context-based service rule storage. Upon identifying a matching rule for a specific middlebox service, the middlebox service in the set of middlebox services 725 performs a service operation (e.g., a WAN optimization operation, a firewall operation, a load balancing operation, an encryption operation, other middlebox operation, etc.), based on the action parameter set (e.g., based on optimization parameters, Allow/Drop parameters, load balancing criteria, encryption parameters, etc.) of the matching rule.

In some embodiments, the context-based service rule storage is defined in a hierarchical manner to ensure that a message rule check will match a higher priority rule before matching a lower priority rule, when the message's contextual attribute subset matches multiple rules. Also, in some embodiments, the context-based service rule storage contains a default rule that specifies a default action for any message rule check that cannot identify any other service rules; this default rule will be a match for all possible attribute subsets in some embodiments and ensures that the service rule engine will return an action for all received attribute subsets. In some embodiments, the default rule will specify no service.

After providing (at 815) the middlebox service, the process determines (at 820) whether the middlebox service has a peer middlebox at a destination that requires contextual data. If there is a peer at a destination that requires contextual data, the process includes (at 825) contextual data in the data message. In the embodiment depicted in FIG. 9, the WAN optimization process has a peer that requires contextual data and a custom header is included between a first encapsulation stage and a second (IPSec) encapsulation stage. The custom header, in some embodiments, is a header that is understood by a destination edge host and includes the contextual data needed by the middlebox services provided by the destination edge host (e.g., information indicating an action state and options relevant to that action, such as an encryption method used by a middlebox service to encrypt the data message).

Once the custom header is included, or if the process determines (at 820) that no peer at a destination edge host of the data message requires peer data, the process forwards (at 830) the data message to the destination. In some embodiments, forwarding the data message includes encapsulating the data message with a further encapsulation to be sent to a different datacenter using a tunneling or security protocol, for example using IPSec as depicted in FIG. 9.

Figure 11:
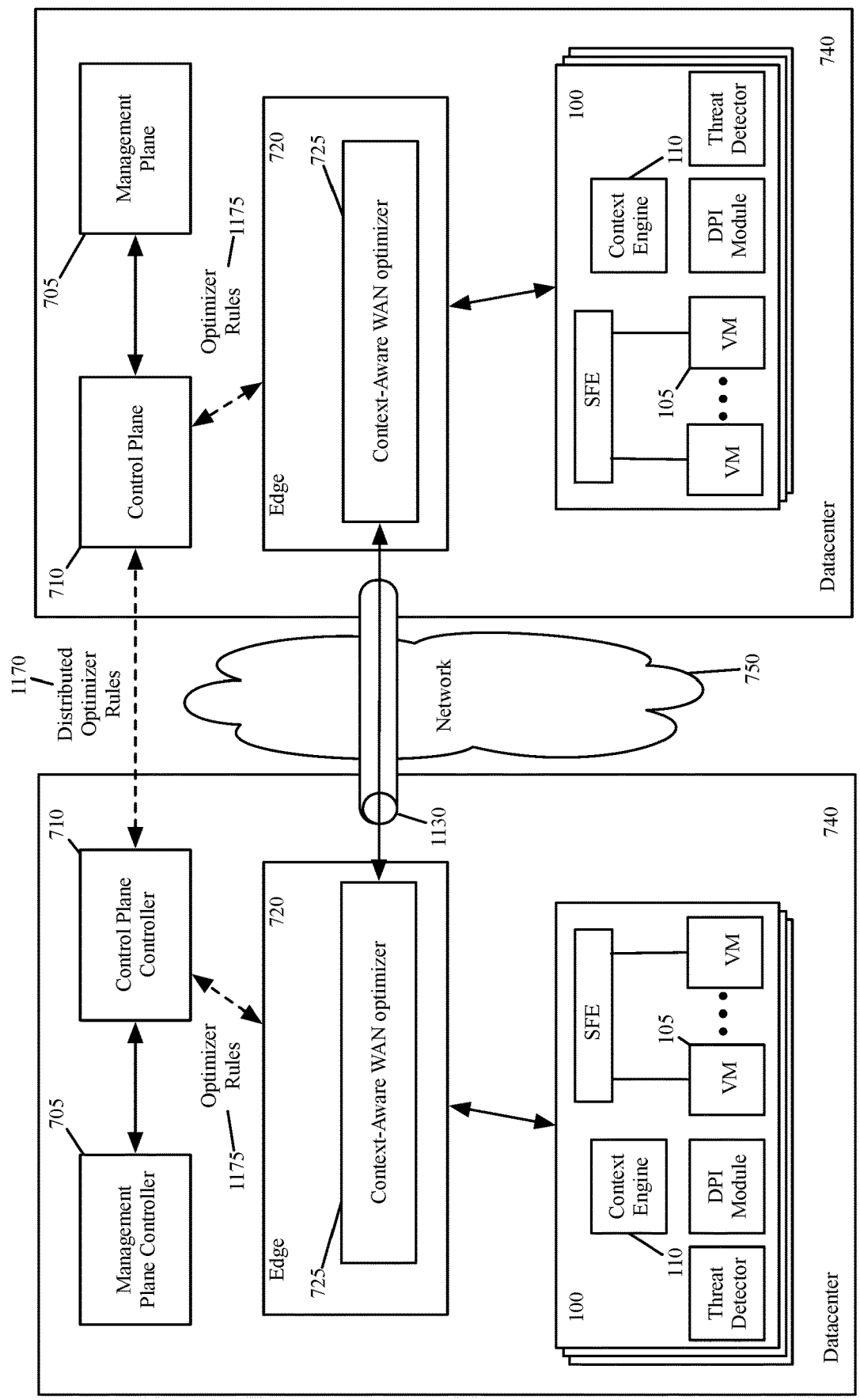
FIG. 11 illustrates an embodiment in which the middlebox service is a context-aware WAN service and a specific connection is established for inter-datacenter communication.

FIG. 11 illustrates an embodiment in which the middlebox service is a context-aware WAN service and a specific connection is established for inter-datacenter communication. FIG. 11 depicts first and second datacenters 740 both operating WAN optimizers 725 in edge hosts 720. Control plane controllers 710 maintain a set of distributed optimizer rules 1170 that, in some embodiments, represent all the context aware WAN optimizer rules that could be applied at edge hosts. The control plane controllers 710 pass a set of optimizer rules to the context-aware WAN optimizers for the WAN optimizers to use in providing the WAN optimization service. In some embodiments, optimizer rules 1175 passed to a particular context-aware WAN optimizer 725 are a subset of the distributed optimizer rules 1170 that are relevant to VMs operating in the datacenter 740 for which the WAN optimizer 725 is providing services, while in other embodiments, all the rules are passed to each WAN optimizer 725. FIG. 11 also explicitly illustrates tunnel 1130 that is used for communications between the datacenters for which WAN optimization services are provided.

As discussed above in relation to FIG. 7, while shown as a module of an edge host 720, WAN optimizer 725, in some embodiments, is a virtual machine (e.g., a service VM), container, or process executing on the edge host 720. In some embodiments, WAN optimizer 725 executes on a separate physical device. In such embodiments, the physical device is one of a standalone WAN optimizer device, and a virtual machine, container, or software executing on the separate physical device. One of ordinary skill in the art will understand that other services such as load balancing and firewall services can be provided in a similar manner to the WAN optimization service.

Figure 12:
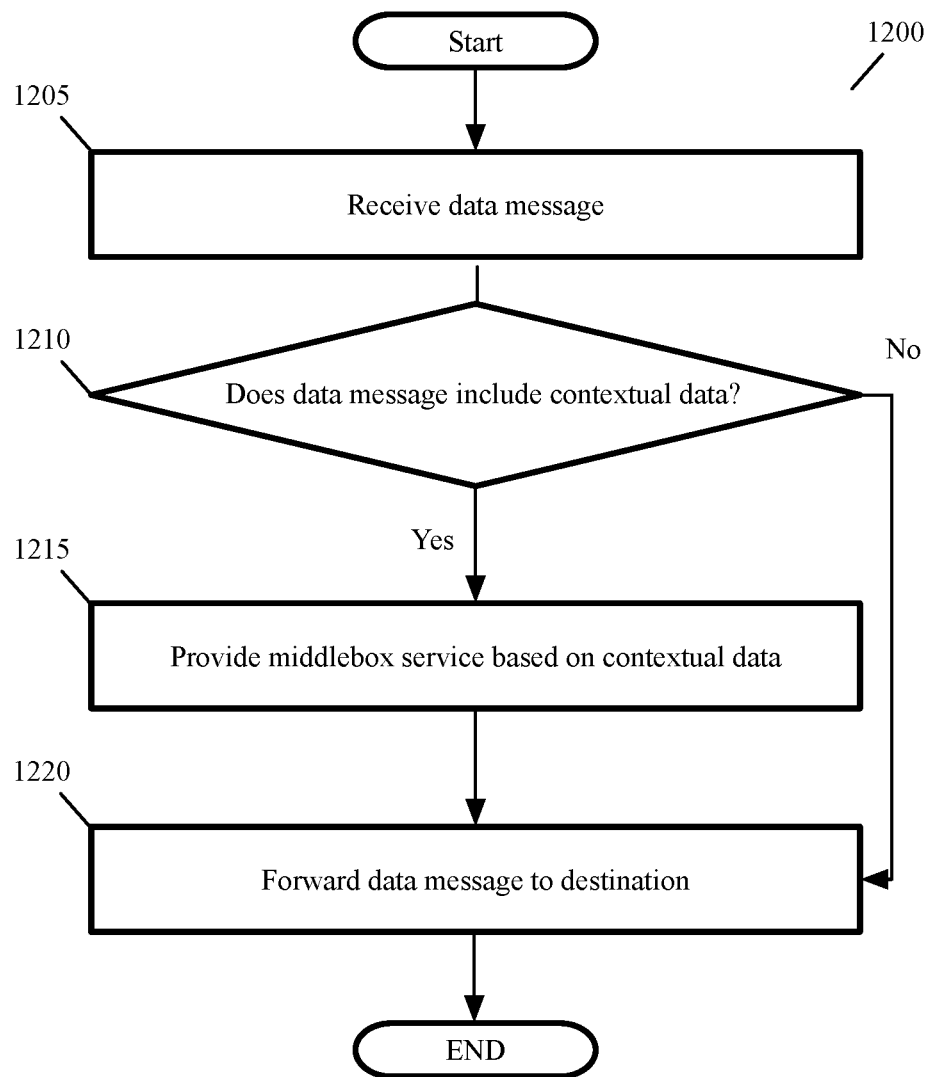
FIG. 12 conceptually illustrates a process performed by an edge host operating context-aware edge services that receives a data message from another datacenter.

FIG. 12 conceptually illustrates a process 1200 performed by an edge host operating context-aware edge services that receives a data message from another datacenter. Process 1200 begins when an edge host receives (at 1205) a data message from an edge host in another datacenter. If the data message is encapsulated as described in relation to FIG. 9, the data message will be processed to remove the tunneling encapsulation or deencrypt the encrypted data message.

The process then determines (at 1210) whether the data message includes contextual data. As described above, the contextual data, in some embodiments, is included in a custom header. The custom header contains contextual data that indicates the processes, algorithms, encryption keys, etc. used by the middlebox service that processed the data message at the other datacenter, for the receiving middlebox service to use to provide the middlebox service before forwarding the data message to its destination. In some embodiments, contextual data is included in an inner header and reflects the contextual data passed to the first middlebox service for use by a machine in the second datacenter (e.g., an edge host hosting an edge gateway, or a host machine hosting a destination machine) that processes the data message on its path to a destination machine.

If the process determines (at 1210) that the data message includes contextual data, the process provides (at 1215) the middlebox service (or services) associated with the contextual data to the data message and forwards (at 1220) the data message to its destination and the process ends. If the process determines (at 1210) that the data message does not include contextual data, the process forwards (at 1220) the data message to its destination and the process ends. In some embodiments, forwarding (at 1220) the data message includes providing additional middlebox services besides those associated with any contextual data included in the custom header.

Figure 13:
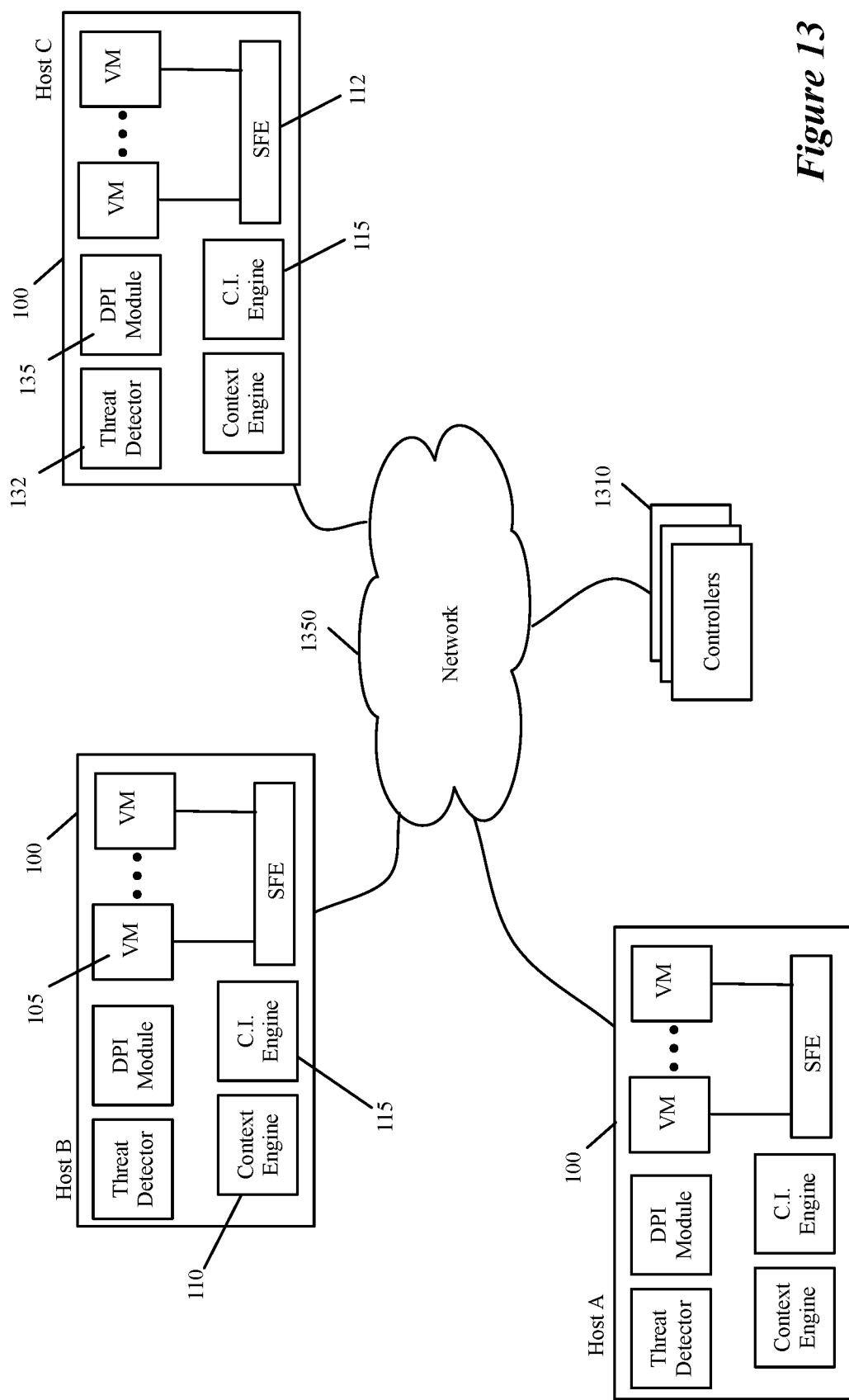
FIG. 13 illustrates an example of how the service engines are managed in some embodiments.

FIG. 13 illustrates an example of how the Context engines 110 are managed in some embodiments. This figure illustrates multiple hosts 100 in a datacenter. As shown, each host includes several context engines 110, a context insertion engine 115, a threat detector 132, a DPI module 135, several VMs 105, and an SFE 112. It also illustrates a set of controllers 1310 for managing the context engines 110, context insertion engines 115, VMs 105, and SFEs 112. As mentioned above, the context engines 110 in some embodiments collect contextual attributes that are passed to the management servers in the controller set through a network 1350 (e.g., through a local area network, a wide area network, a network of networks (such as the Internet), etc.). The controller set provides a user interface for the administrators to define context-based service rules in terms of these collected contextual attributes and communicates with the hosts through the network 1350 to provide these policies. The hosts also communicatively connect to each other through this network 1350.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
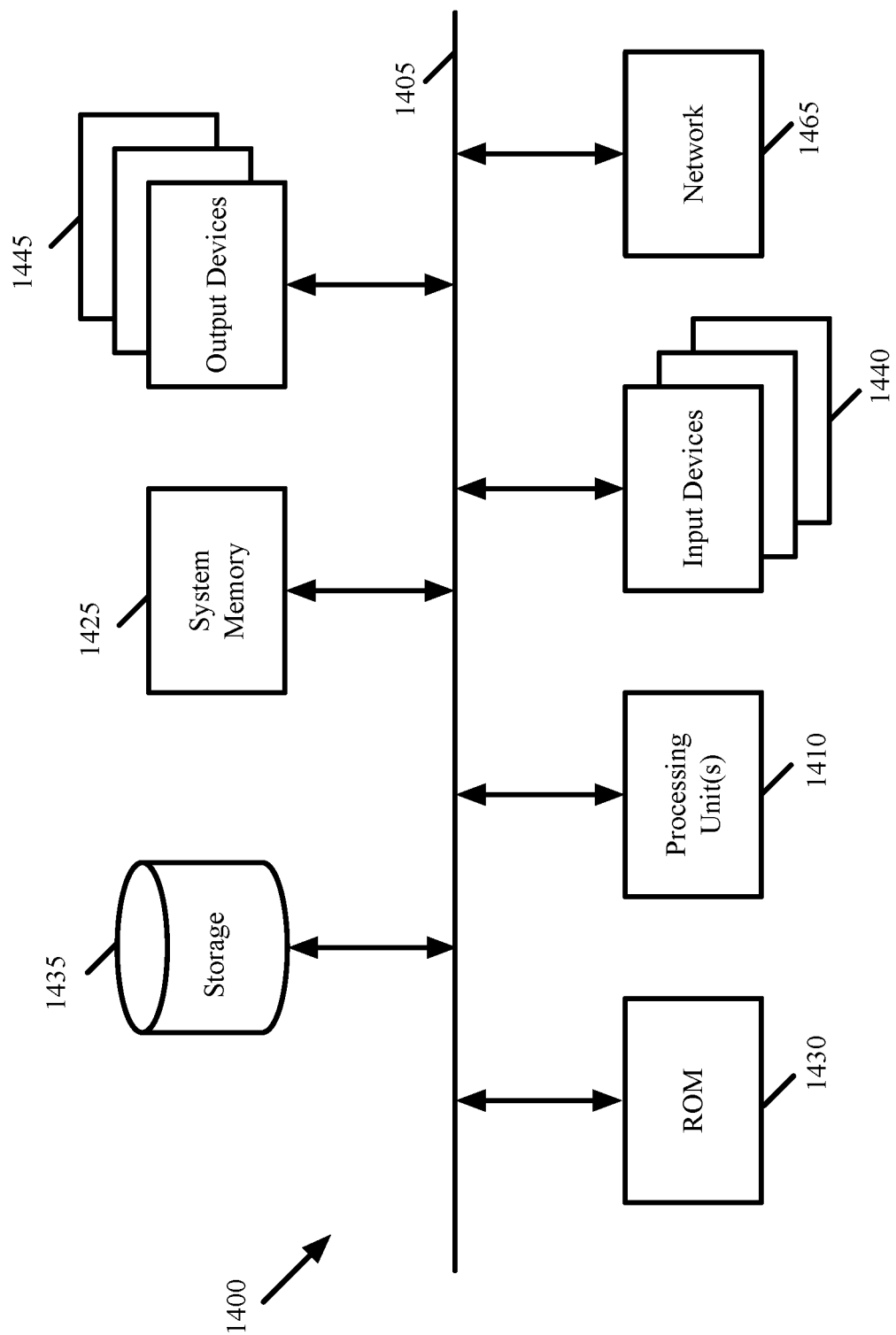
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, and managers. As such, it can be used to execute any of the above described processes. This computer system includes various types of non-transitory machine readable media and interfaces for various other types of machine readable media. Computer system 1400 includes a bus 14105, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for performing a service operation on data message sent from a first datacenter to a second datacenter, the first datacenter comprising a plurality of host computers and at least one edge gateway that connects the first datacenter to the second datacenter, the method comprising:

on a host computer executing a first machine;
receiving, from the first machine, a data message that is destined for a second machine in the second datacenter;
receiving, from an agent executing on the first machine, a set of contextual data related to the data message, the contextual data comprising a set of attributes other than L2-L4 header values of the data message;
encapsulating the data message with a generic network virtualization encapsulation (GENEVE) header and storing data regarding at least a subset of the received contextual attributes in the GENEVE header, wherein a GENEVE context header insertion processor executing in a kernel identifies the data regarding the received contextual attributes and includes the identified data regarding the received contextual attributes in the GENEVE header; and
forwarding the encapsulated data message to the edge gateway to perform a context-based service operation on the data message before forwarding the data message to the second datacenter.

2. The method of claim 1, wherein the second machine is at least one of a dedicated machine, a hardware appliance, a virtual machine and a container.

3. The method of claim 1, wherein the edge gateway is a dedicated edge gateway device that performs the service operation.

4. The method of claim 3, wherein the edge gateway device executes a set of at least one of service modules, service virtual machines, and containers to implement the edge gateway and to perform a set of service operations comprising the context-based service operation.

5. The method of claim 1, wherein performing the context-based service operation comprises calling a separate physical device from the edge gateway, wherein the separate device is one of a hardware appliance, and a host machine hosting one of a service virtual machine, a service module, and a container to perform the context-based service operation.

6. The method of claim 1, wherein forwarding the data message to the second datacenter comprises including contextual data in the forwarded data message for an edge gateway of the second datacenter to use to perform a second service operation.

7. The method of claim 1, wherein the set of contextual attributes received from the agent comprises a set of header values used to identify the data regarding the received contextual attributes.

8. The method of claim 7, wherein the data regarding the received contextual attributes identifies an application executing on the source machine that was the source of the data message.

9. The method of claim 1, wherein the GENEVE context header insertion processor receives a callback when an outbound data message is received by an I/O stack of the host computer.

10. The method of claim 1, wherein the service operation is one of a WAN optimization operation, a firewall operation, a load balancing operation, an intrusion detection operation, a quality of service operation, and a URL filtering operation.

11. A method for performing a service operation on data messages in a logical network defined as an overlay network on a physical network, the logical network implemented by managed forwarding elements that execute on host computers and an edge gateway that connects the logical network to an external network, the method comprising:
on a host computer;
receiving, from a first machine executing on the host computer, a data message that is destined for a machine in the external network;
receiving, from an agent executing on the first machine, a set of contextual attributes related to the data message, the contextual data comprising a set of attributes other than L2-L4 header values of the data message;
encapsulating the data message with a generic network virtualization encapsulation (GENEVE) header and storing data regarding at least a subset of the received contextual attributes in the GENEVE header, wherein a GENEVE context header insertion processor executing in a kernel identifies the data regarding the received contextual attributes and includes the identified data regarding the received contextual attributes in the GENEVE header; and
forwarding the encapsulated data message to the edge gateway to perform a context-based service operation on the data message before forwarding the data message to the external network.

12. The method of claim 11, wherein the edge gateway is a dedicated edge gateway device that performs the service operation.

13. The method of claim 12, wherein the edge gateway device executes a set of at least one of service modules, service virtual machines, and containers to implement the edge gateway and to perform a set of service operations comprising the context-based service operation.

14. The method of claim 11, wherein performing the context-based service operation comprises calling a separate physical device from the edge gateway, wherein the separate device is one of a hardware appliance, and a host machine hosting one of a service virtual machine, a service module, and a container to perform the context-based service operation.

15. The method of claim 11, wherein the set of contextual attributes received from the agent comprises a set of header values used to identify the data regarding the received contextual attributes.

16. The method of claim 15, wherein the data regarding the received contextual attributes identifies an application executing on the source machine that was the source of the data message.

17. The method of claim 11, wherein the GENEVE context header insertion processor receives a callback when an outbound data message is received by an I/O stack of the host computer.

18. The method of claim 11, wherein the service operation is one of a WAN optimization operation, a firewall operation, a load balancing operation, an intrusion detection operation, a quality of service operation, and a URL filtering operation.

* * * * *